A. R. KEPPERLING.
Car-Couplings.

No. 146,687.　　　　　　　　　　Patented Jan. 20, 1874.

Witnesses.　　　　　　　　　　Inventor.

UNITED STATES PATENT OFFICE.

ABRAHAM R. KEPPERLING, OF SAFE HARBOR, ASSIGNOR OF ONE-HALF HIS RIGHT TO THOMAS J. DAVIS, OF LANCASTER, PENNSYLVANIA.

IMPROVEMENT IN CAR-COUPLINGS.

Specification forming part of Letters Patent No. 146,687, dated January 20, 1874; application filed March 17, 1873.

*To all whom it may concern:*

Be it known that I, ABRAHAM R. KEPPERLING, of Safe Harbor, in the county of Lancaster and State of Pennsylvania, have invented certain Improvements in Car-Couplings, of which the following is a specification:

This invention relates to that class of car-couplings designed to act automatically by simple contact of the bumpers or bull-heads, without running the risk of being trapped between them.

The novelty consists in the arrangement of a peculiar hook and jointed tripper at its base. This hook is held by a pivot in a slot made in the bumper, which latter is also provided with a slot to receive a similar hook on the bumper of the car to be coupled.

Figure 1:
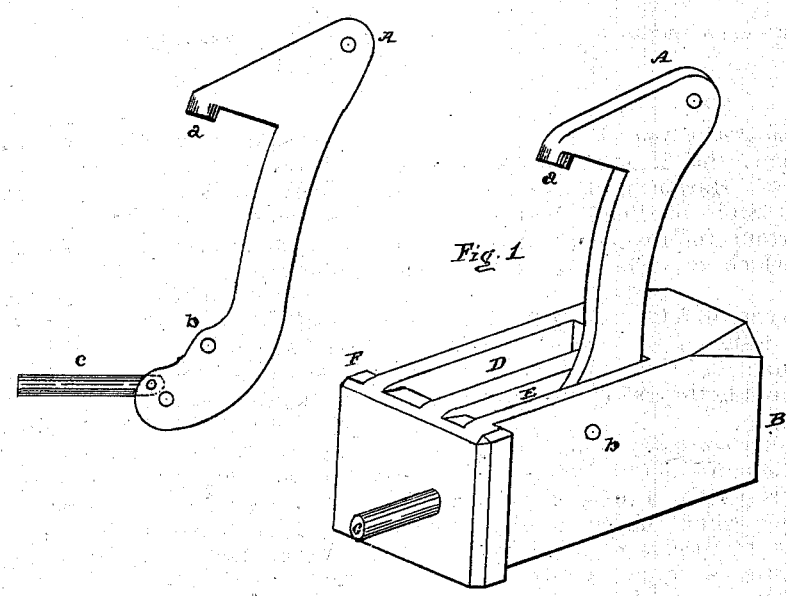
Figure 2:
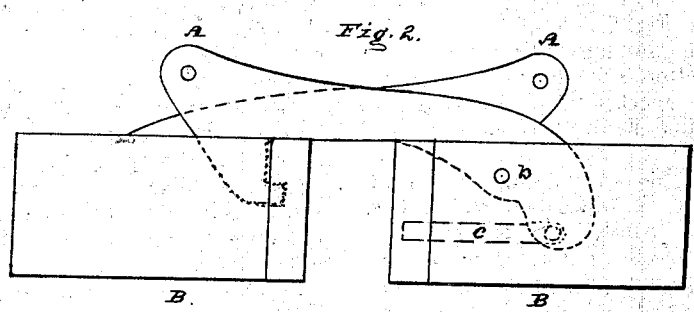

The accompanying drawings show the construction, in which Figure 1 shows the hook raised in its slot and the tripper at its base protruded. The hook and tripper are also shown detached. Fig. 2 is a side view of the couplings in place connecting two cars.

A brief description will clearly explain the construction and operation of the same, so that any one skilled in the art can make and use this coupling.

The supporting head or bumper B, Fig. 1, has a widened slot, D, and a narrower slot, E, on its upper face, parallel to each other. In the slot E, the heel of the hook A is held by a pivot, $b$. The upper portion of this coupling-hook is widened out into a triangular head, terminated below by a nipple, $a$. The lower end is prolonged beyond the pivot $b$ and slotted for the reception of the end of the tripper C, attached by a pivot. This tripper C enters and passes through a perforation made in the head of the bumper, as shown, when the coupling-hook is raised. There is also a depression made on the forward inner face of the coupling-slot, into which the nipple or rounded projection $a$ of the hook A engages. This projection is shown more prominent than is necessary; it is simply to prevent any sudden jar from throwing the hook out of the slot, which could hardly occur, as its weight would keep it in place when the whole is made of wrought-iron.

I am aware that hooks are variously employed and operated.

The perforation in the head of the drop-hook is intended for attaching a rope or its equivalent, for drawing it up when the cars are slacked up, as is the case when links and bolts are used.

These hooks will readily couple into their respective slots when down; but it is designed to have them thrown back. The protruding tripper on their lower end, coming in contact with the head of the opposing bumper, is pushed back, thus tilting the head of the hook forward or down into the open slot on their side, respectively. On starting they firmly engage, and the result is a permanent coupling is secured. Sufficient width is given to the slots to insure the lodgment of the hook when the cars stand upon any curve ordinarily made in the road.

What I believe to be novel is the tripper connected with the coupling-hook, which causes it to act with certainty automatically, without the risk attending the link-connection, so dangerous and often fatal to conductors of freight trains, which evil it is designed to obviate by this simple, cheap, and efficient device for coupling cars.

I do not claim a hook with a prolonged end when said hook is held upon a shaft provided with a lug and lifter; nor do I claim a mortised toggle-slide.

What I claim is—

The tripper C, hinged or connected to the hook A, in combination with the slotted head B, the whole arranged in the manner and for the purpose shown and described.

ABRAHAM R. KEPPERLING.

Witnesses:
 CYRUS SHAEFFER,
 JACOB STAUFFER.